April 2, 1946.  E. B. ANDERSON  2,397,585
METHOD OF FABRICATING A UNIVERSAL JOINT
Filed Oct. 1, 1940
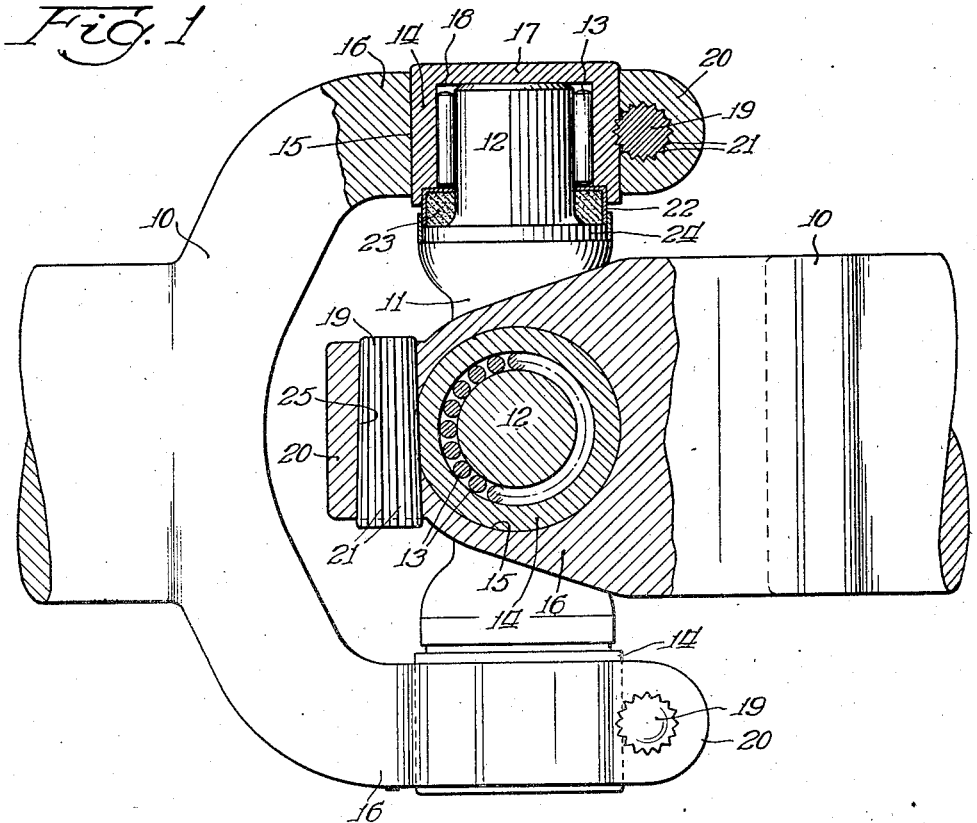
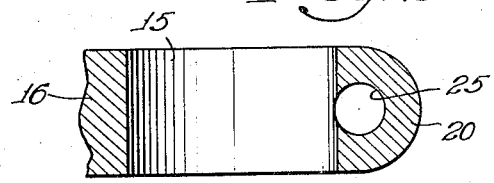
Inventor:
Edmund B. Anderson
By: Edward C. Gritzbaugh
Atty.

Patented Apr. 2, 1946

2,397,585

UNITED STATES PATENT OFFICE 2,397,585

METHOD OF FABRICATING UNIVERSAL JOINTS

Edmund B. Anderson, Rockford, Ill., assignor to Borg-Warner Corporation, Chicago, Ill., a corporation of Illinois Application October 1, 1940, Serial No. 359,258

2 Claims. (Cl. 148—19)

This invention relates to the method of making universal joints and has as its object to provide a universal joint of simplified construction and reduced cost as compared to joints now available. More specifically, the invention aims to provide a novel arrangement for securing a pair of trunnion bearing cups in the respective arms of a yoke member, in accurately located relationship to a connecting spider having trunnions received in such bearing cups. Accuracy of axial positioning of the bearing cups is quite important in the conventional universal joint of the type employed in the propeller shafting of vehicles, in view of the fact that closely fitted sealing devices are employed between the bearing cups and the bases of the trunnions for protecting the bearings against the entry of destructive foreign matter and for retaining lubricant and in view of the further fact that the contact of the ends of the trunnions with the inner surfaces of the end walls of the bearing cups is relied upon for centering the spider with reference to the axis of rotation of the yoke member, and it is therefore required that the tolerances between the ends of the trunnions and the ends of the bearing cups be held to a strict minimum. The requirement for accuracy of positioning of the bearing cups with reference to the yoke arms has been constantly made more severe by the motor vehicle manufacturers.

Heretofore, a widely used method of securing the bearing cups in the yoke arm has been to employ bearing cups having attaching ears, and to machine coacting seating surfaces on the bearing cups and yoke arms respectively. This method of locating the bearings has proven to be satisfactory, but is quite expensive, because of the machining required, particularly in forming the bearing cups. Another method that has been employed is to interpose between a bearing and a yoke arm a securing element such, for example, as a snap ring, seating against machined surfaces on both the bearing and the yoke arm. It will be readily apparent that with the interposition of an intermediate member between the bearing and the yoke arm, the accumulated error in the dimensions of the several parts may easily become great enough to pass beyond the allowable total tolerance, and that the tolerance on each individual part must therefore be held to a smaller minimum. With this particular type of joint, it has been customary to require that the distance between the inner surface of the end wall of the bearing cup and a locating seat in the exterior of the cup, be maintained within a tolerance of only .0005 inch.

Such exacting requirements necessarily increase the cost of construction of a universal joint, and this invention therefore has as a primary object to provide a novel method of constructing and assembling the parts of a universal joint so as to eliminate many of the machining operations which have heretofore been necessary. To this end the invention contemplates an arrangement wherein there are no preformed locating surfaces on the bearing cups or the yoke arms, for determining the position of assembly of the bearing cups in the yoke arms along the trunnion axis. Instead, the invention provides for determining the exact position of assembly along the trunnion axis during the assembly operation, and provides for securing the bearing cups firmly in the positions thus determined.

A further object of the invention is to provide an improved arrangement of bearing cup and means for securing the same in a socket or bore of a yoke arm in a position determined during assembly.

Other objects, the advantages and uses of the invention will become more apparent after reading the following specification and claims, and after consideration of the drawing forming a part of the specification, wherein:

Fig. 1 is a view, partially in elevation and partially in section, of a universal joint embodying the invention; and Fig. 2 is a detail sectional view of a yoke arm prior to assembly of a bearing cup therein.

As an example of one form in which the invention may be embodied, I have shown in the drawing a universal joint comprising a pair of yoke members 10 connected by a cross-shaped spider 11 having four trunnions 12 arranged on two intersecting axes at right angles to each other. The trunnions 12 are journalled through the medium of bearing rollers 13, in bearing cups 14 which are mounted in bores 15 in the arms 16 of the yokes 10.

The bearing cups 14 have end walls 17 the inner surfaces 18 of which are in abutting relationship with the ends of the trunnions 12.

The bearing cups 14 are secured in assembled positions in the yoke arms 16 by means of keys 19 extending transversely through end portions 20 of the yoke arms 16, and engaging side regions of the bearing cups 14.

The keys 19 are of hardened construction and provided each with a series of sharp-edged flutes 21 which are impressed in the end regions 20 of the yoke arms 16 and in the side regions of the bearing cups 14 so as to securely hold the bearing cups 14 against axial movement in the bores 15. The embedding in the arms 16 secures the keys against rotation therein, and the embedding in the bearing cups 14 anchors the bearing cups against axial movement.

In the fabrication of the joint, the bores 15 are reamed to accurately fit and snugly receive the exterior cylindrical surfaces of the bearing cups 14, so that the bearing cups may be accurately located in axial and circumferential directions with reference to the yoke axis.

The bearing cups 14 are formed from mild steel either by stamping and coining from heavy sheet or plate stock, or by turning from bar stock of the proper diameter. The outer surfaces of the cups are then copper plated. The cups are then carburized. During the carburizing operation, the interior regions of the cups are hardened while the exterior regions remain soft as a result of the copper coatings which prevent access of the carburizing material to the steel.

The bores of the cups are then ground to produce the desired smooth cylindrical interior bearing surfaces against which the rollers 13 operate, and the flat end walls 18 against which the ends of trunnions 12 locate.

The exterior cylindrical surfaces of the bearing cups are likewise ground down to a snug fit within the bores 15. This grinding operation removes the copper plating and exposes the soft steel beneath.

The yoke arms are formed with openings 25 for the reception of the fluted pins 19. The openings 25 communicate with the bores 15 so that the bearings 14 may project into the openings 25 for engagement by the keys 19. The openings 25 are of smaller diameter than the outer diameter of the keys 19, but of larger diameter than the diameter of the keys 19 at the base of the flutes 20.

In the assembling of the joints, a spider 11 is initially assembled to a yoke 10 by inserting its trunnions 12 into the bores 15 of the yoke. This can be easily accomplished by first inserting one trunnion into its respective bore while the spider is held at such an angle that the other trunnion will clear the opposed yoke arms from a side or an end thereof. The trunnion that is received in the yoke arm bore is pushed through the bore sufficiently to enable the end of the opposite trunnion to clear the inner side of the opposite yoke arm. The opposite trunnion may then be inserted into its respective bore.

In the next operation, the bearing cups which have previously been supplied with sets of bearing rollers 13, held in place by retainer rings 22 pressed into the ends of the cups, are inserted into the bores 15 from the outer sides thereof, while the trunnions 12 are centered and inserted into the bearings. The bearing cups are forced inwardly until the inner end walls 18 thereof contact the ends of the trunnions 12, or until a predetermined spacing between the opposite ends of the two bearings is reached. This is done against the resistance of resilient packing rings 23 of cork or other suitable packing material which are interposed between the retainer rings 22 and the bases 24 of the trunnions 12, and may if desired be accomplished in an appropriate fixture in which such spacing is accurately determined.

With the bearings thus accurately positioned in the yoke arms, the keys 19 are driven into the openings in the end regions 20 of the yoke arms. As the keys are driven in, the flutes 21 will be impressed into the relatively soft metal of the bearing cups and yoke arms respectively and cause the metal to flow into the channels defined between the flutes, filling the same.

In order to facilitate the driving of the keys, they are preferably tapered longitudinally.

The axes of the keys are arranged at right angles to the axis of the bearings, so that the flutes 21 will extend transversely of the direction in which the bearings would have to move in order to become dislodged from the positions in which they are thus secured.

The invention provides a very simple and inexpensive method and means for securing a pair of bearings in a pair of corresponding yoke arms. It eliminates the necessity for forming ears on the bearing cups, and makes it possible to employ much less expensive cups of simple cylindrical form. It eliminates the necessity of preforming locating surfaces on the bearings and yoke arms, other than the bores 15 and the cylindrical exterior surfaces of the bearing cups, which can be produced fairly inexpensively.

The invention has the further advantage of facilitating disassembly of the joint. In order to take the joint apart, it is only necessary to drive out the keys 19. It is contemplated that in the event of disassembly of a joint for repair, the opening formerly occupied by the key, and the grooved side surface of the bearing, will be machined down to remove the impressions of the flutes 21, and a larger key will be employed in reassembling the joint. This will make it possible to secure the same accuracy of assembly upon the reassembling operation, as during the original assembling operation.

While I have described my invention in connection with one specific embodiment thereof, it is to be understood that this is by way of illustration and not by way of limitation and the scope of my invention is defined solely by the appended claims which should be construed as broadly as the prior art will permit.

I claim:

1. The method of fabricating a universal joint comprising forming a yoke having arms provided with bores disposed radially with reference to the yoke axis, finishing said bores to accurate dimensions, forming a pair of bearing cups, plating the exterior surfaces of the cups, carburizing the cups to harden the interior surfaces thereof while the exterior surfaces remain unhardened as a result of said plating, removing the plating from the exterior surfaces of the cups and finishing said exterior surfaces to accurate fit in said bores, inserting the bearings in the bores, and securing them therein by hardened keys driven into the yoke arms so as to simultaneously engage and become impressed into regions of the yoke arm and regions of the bearings and to thereby secure said keys against rotation and cause said keys to secure the bearings against displacement in the bores.

2. The method of fabricating a universal joint comprising, forming a yoke having arms provided with bores disposed radially with reference to the yoke axis, forming an opening in each yoke arm extending transversely with respect to the bore therein and intersecting a side region thereof, finishing said bores to accurate dimensions, forming a pair of bearing cups, plating the exterior surfaces of the cups, carburizing the cups to harden the interior surfaces thereof while the exterior surfaces remain unhardened as a result of said plating, removing the plating from the exterior surfaces of the bearing cups and finishing the exterior surfaces of the bearing cups to an accurate fit in the bores, inserting the trunnions of a torque transmitting member into the bores of said yoke, inserting the bearing cups into the bores with the side wall of the bearing cups disposed between the trunnions and the bores until the bottom wall of each bearing cup engages the adjacent end of its associated trunnion to thus locate the bearing cups in the yoke so that objectionable end play between the trunnions and bearing cups is eliminated, and securing the bearing cups in the bores by hardened keys driven into the openings in the yoke arms so as to simultaneously engage and become impressed into the regions of the yoke arms defining said openings and the regions of the bearing cups projecting into said openings to thereby secure said keys against rotation and dislodgement and cause said keys to secure the bearing cups against axial displacement in the bores.

EDMUND B. ANDERSON.